S. M. GREEN.
ELECTROLYTIC CELL.
APPLICATION FILED FEB. 26, 1921.
1,404,387.
Patented Jan. 24, 1922.
2 SHEETS—SHEET 1.
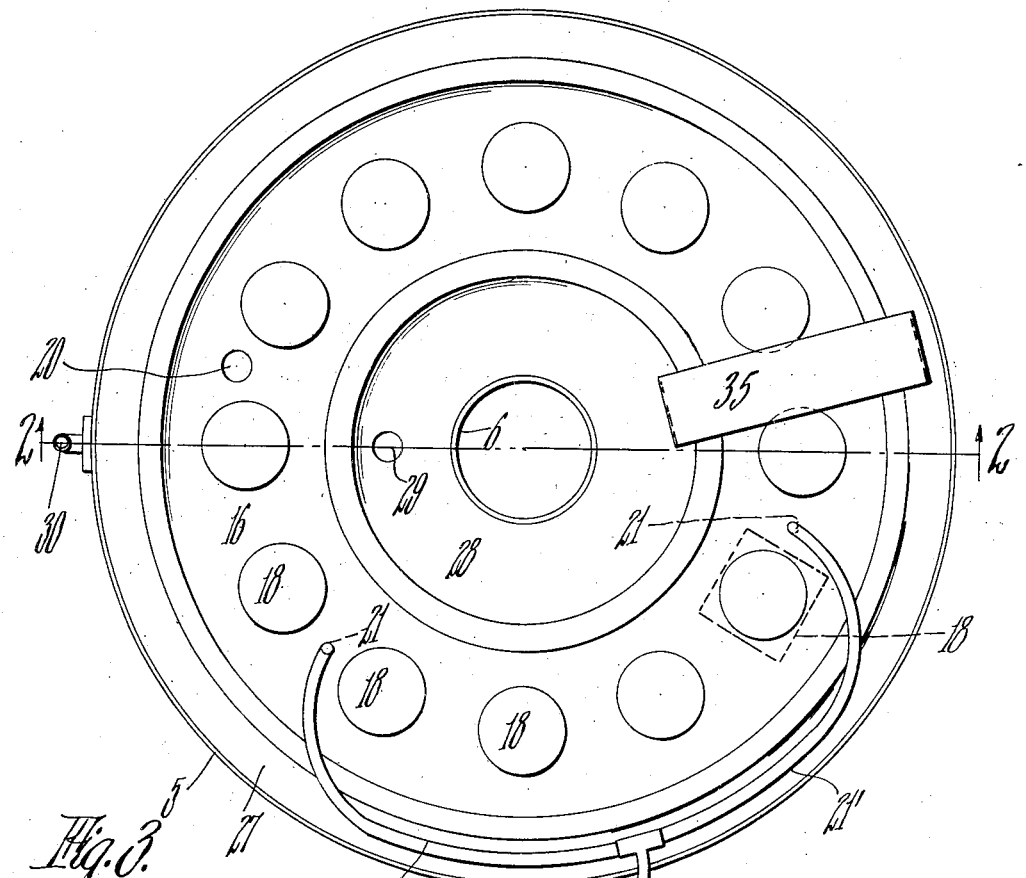
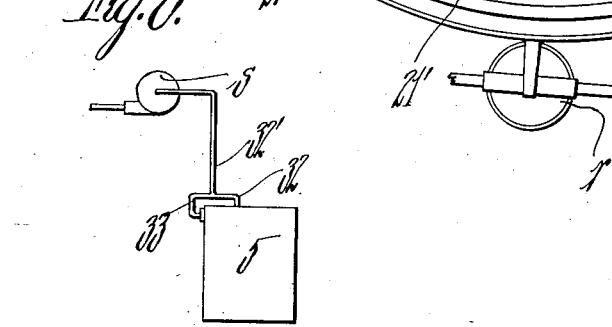
INVENTOR
Samuel M. Green.
BY Chapin & Neal
ATTORNEYS

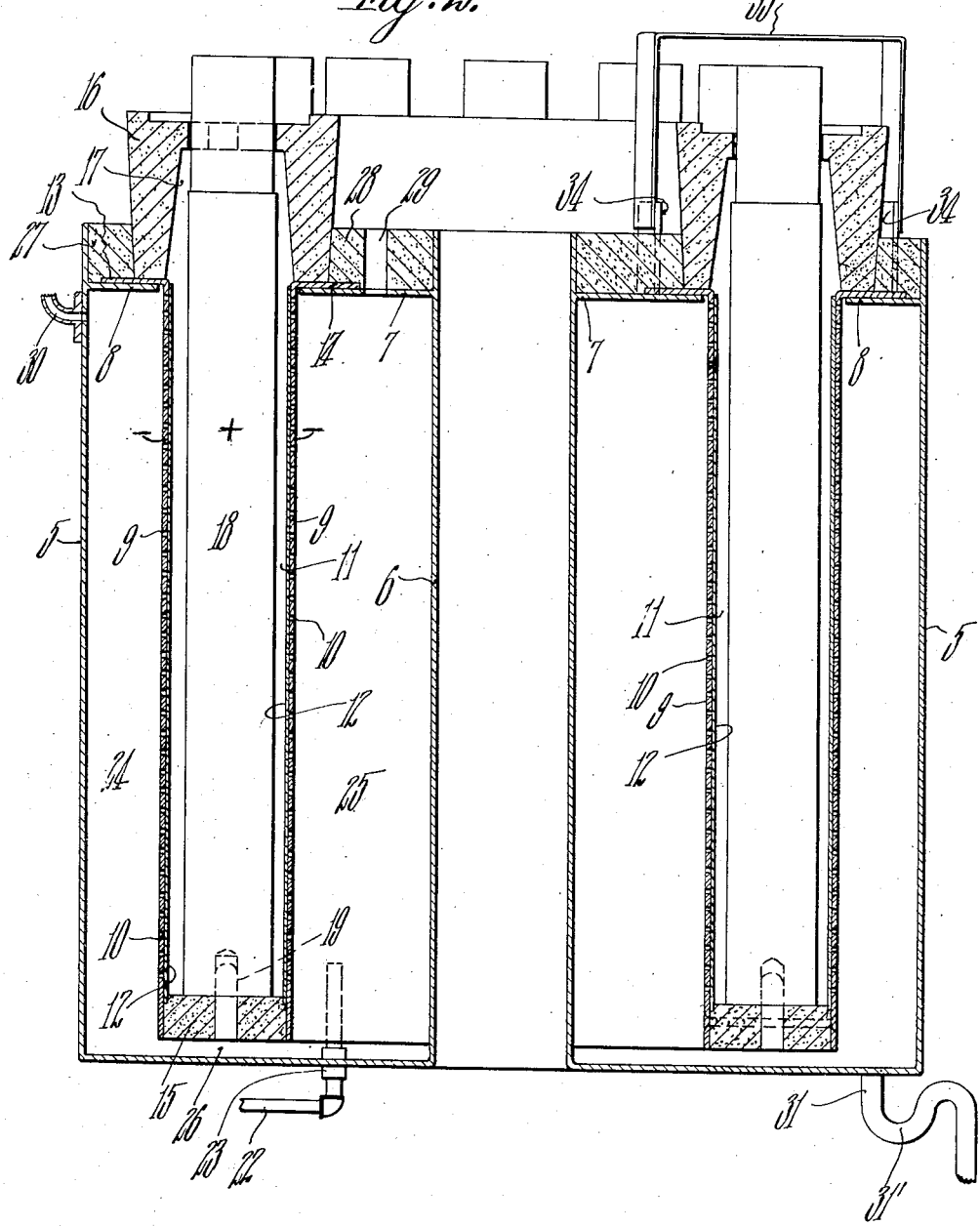

UNITED STATES PATENT OFFICE.

SAMUEL M. GREEN, OF SPRINGFIELD, MASSACHUSETTS.

ELECTROLYTIC CELL.

1,404,387.

Specification of Letters Patent. Patented Jan. 24, 1922.

Application filed February 26, 1921. Serial No. 447,908.

*To all whom it may concern:*

Be it known that I, SAMUEL M. GREEN, citizen of the United States, residing at Springfield, in the county of Hampden and State of Massachusetts, have invented new and useful Improvements in Electrolytic Cells, of which the following is a specification.

This invention relates to an improved electrolytic cell, which is capable of application generally to the electrolysis of various electrolytes. As an example of one specific use, the improved cell is particularly adapted for use in the electrolytic production of chlorine and caustic soda by the decomposition of a sodium chloride electrolyte.

One object of the invention is to provide a cell of the substantially cylindrical type which is provided with two endless, and preferably cylindrical, cathodes, one within the other, forming an endless, and preferably annular, anode chamber to receive an anode or series of anodes.

A cell, constructed in this manner, provides, for the same outside dimensions, a very substantial increase in the area of active cathode surface over the ordinary cylindrical cell. The improvement makes it possible to practically double the output of a cell of the cylindrical type without material increase in its outside dimensions and the floor space occupied thereby. At the same time, the volume of the anode chamber is substantially decreased due to its endless and preferably annular, rather than circular, cross-section, whereby a very considerable reduction is made in the volume of the electrolyte necessary at any one time to fill this chamber. For cells of equal ampere capacity, a cell embodying my invention contains somewhat less than half the electrolyte required in an ordinary cylindrical cell. The reduction in the volume of the electrolyte is important, not only because the electrolyte (in this case a concentrated solution of pure sodium chloride) contains an expensive ingredient and is expensive to prepare, but because whenever the cell is shut down the electrolyte in the tank drains off and later has to be evaporated to recover the salt. The expense of recovering the salt is reduced to a minimum by having in the cell at any one time the least possible volume of electrolyte which is compatible with successful and efficient operation of the cell. Moreover, on starting the cell, the anode compartment has to be filled before the current is turned on and, during the time occupied in filling the cell, salt brine is constantly percolating through the diaphragm and drains off to the evaporating equipment, where it has to be evaporated to recover the salt. The amount of salt thus lost is proportional to the time occupied in filling the cell, and the smaller the anode compartment the quicker it can be filled. A small amount of liquor in the anode compartment provides for more rapid change of the partially spent anode liquor, and therefore prevents to a considerable degree the formation of intermediate products, such as hypochlorites and the like.

The invention has for another object to provide a sealed chamber, or chambers, to encompass the anode chamber, and means for connecting such chamber or chambers to a suction device, so that varying degrees of vacuum may be established in the space surrounding the anode chamber.

By this arrangement, the flow of electrolyte, or, more properly, electrolyzed salt brine and caustic soda, through the cathodes (which, as usual, are foraminous and carry diaphragms), may be accelerated and controlled, as necessary or desired. The advantage of this arrangement is best appreciated from a consideration of the variation of the flow through the diaphragms. When new, there is a very large and abnormal flow of sodium chloride and caustic soda through the diaphragms. After a short period, the flow gradually decreases and becomes practically normal. From this time on, the diaphragms gradually tighten and the flow therethrough decreases with a resultant increase in the caustic soda content. If such increase becomes too great, the efficiency of the cell is rapidly affected and it is desirable, therefore, to secure as even a flow through the diaphragms during their life, as it is possible to obtain. Thus, as the diaphragms tighten, vacuum may be applied in the chambers surrounding the anode chamber, to increase the flow through the diaphragms and the degree of vacuum may be varied as desired to maintain a practically even rate of flow throughout the life of the diaphragms. A further advantage to be derived from the employment of a suction pull on the chambers outside the cathodes is that such a suction will tend to overcome a clogged condition of the cathode diaphragms and thus materially lengthen their time of use before renewal or cleaning is necessary. In addition, the application of a vacuum to a diaphragm of any given area increases the flow through such area over the flow by hydraulic head only, and, because of the increase in flow, a greater current can be utilized in the cell with consequent increase in cell capacity and at practically the same current efficiency.

The two features of the invention, heretofore set forth, may, of course, be used independently with resultant advantages and offer additional advantages when used conjointly and it is desirable, although not essential for all purposes, that they be used together as making for increased efficiency of the cell.

Other objects and advantages will appear in the following description and in the illustrative embodiment of the invention in the accompanying drawings, in which—

Fig. 1 is a top plan view of a cell embodying the invention;

Fig. 2 is a sectional elevation thereof taken on the line 2—2 of Fig. 1; and

Fig. 3 is a conventional view showing the cell and connected suction device.

Referring to these drawings; the cell includes an outer casing 5, which is preferably of cylindrical shape, closed at the bottom and having an open upper end. This casing may advantageously be made of steel and take the general form of a cylindrical tank. Centrally upstanding from the base of the casing 5 is a column 6, which preferably, for economy of material, is made of tubular construction, although it may be otherwise constructed, if desired. Column 6 is provided near its upper end with a circular and outwardly projecting flange 7, which in conjunction with a similar and inwardly extending flange 8, secured to the inner wall of casing 5 near its upper end, serves to support the concrete cover of the cell, as will appear.

Suspended within the casing 5 are two endless, although not necessarily seamless, or jointless, cathodes 9 which are preferably cylindrical in shape and arranged one within another in concentrical relation and concentrically with respect to casing 5. Each cathode 9 may advantageously be formed of steel and, as usual, is foraminous throughout its active portion as indicated by the apertures 10. These two cylindrical cathodes constitute the side walls of an endless, and preferably annular, anode chamber 11 and the inner surface of such walls are lined with diaphragms 12 carried by the cathodes 9. These linings or diaphragms may be constructed in any suitable manner, as for example, by sheets of asbestos applied to the foraminous walls of the cathode and by a sheet of woven asbestos cloth superimposed upon each lining thus formed. The cathodes are bent at their upper ends to provide marginal flanges, the outer cathode having an outwardly turned flange 13 to rest upon flange 8 and the inner cathode having a flange 14 to rest upon flange 7, whereby the cathodes may be suspended within casing 5. Any other means for supporting the cathodes may be employed, as desired.

The bottom of the anode chamber, afforded by the cathodes 9, is suitably closed off as by an annular ring 15, preferably of concrete, which is cast in place between the cathodes 9 and serves to space them properly at their lower ends. The diaphragms 12 preferably extend below the top of ring 15 and may thus be held in position by the latter. The bottom closure, thus provided for the anode chamber, is sealed,—the concrete ring ordinarily forming a sufficient seal although additional sealing means may be employed, if necessary or desired.

The anode chamber is closed at its upper end by a cover 16, which should be of material inert to chlorine gas, such, for example, as concrete. The cover 16 takes the form of an annular ring and is supported near its inner peripheral edge by resting upon the flange 14, which in turn is supported by the flange 7, and near its outer peripheral edge by resting on the flange 13, which in turn is supported upon flange 8. The joints between the cover 16 and flanges 13 and 14 is sealed, as with putty, concrete or other suitable material. The cover 16, intermediate its marginal supporting edges, is provided with an annular chamber 17, which extends above the cathodes and the normal level of the electrolyte in chamber 11, to form a gas dome,—in this instance a dome to receive chlorine gas.

A plurality of anodes 18 are provided and these are arranged in a circular series, passing through cover 16, chlorine dome 17, and extending downwardly into the anode chamber 11, preferably being supported at the base thereof by resting on ring 15. These anodes, which for the present purpose are preferably of graphite, are desirably of square, rectangular or such other construction through their active portions as to provide two opposite faces which parallel, or approximately parallel, the adjacent cathode surfaces. The cross-sectional shape of the upper portions of the anodes may be made as desired, conveniently round, as shown, to facilitate the attachment of terminals (not shown), by means of which all the cathodes are connected in the usual way to a common bus bar.

The anodes 18, the weight of which is preferably borne by the ring 15, should be positioned, and held against lateral displacement, in the anode chamber 11, more especially on account of the relatively narrow anode chamber and the close proximity of the anodes to the cathode walls thereof. This holding and positioning is accomplished, to some extent, in the usual way by having the upper ends of the anodes pass through the cover 16. However, on account of the considerable length of the anodes and their disposition in an anode chamber which is relatively narrow, it is desirable to provide additional means to engage the lower ends of the anodes and insure that they are properly centered, and held thus positioned, in their chamber. The additional means referred to consists of interengageable means on the ring and each anode and may advantageously take the form of a series of dowel pins 19, which may be of glass or other suitable material and set into the concrete ring 15 during its formation. These pins 19 are properly spaced around ring 15 to correspond in location with the anodes 18 and the latter are provided with sockets to receive the pins.

The joint between the upper ends of the cathodes 18 and cover 16 is sealed by suitable means, such as already described, and all other joints or seams in the walls of the anode chamber 11 are sealed as already described, except for the openings now to be described, which openings are adapted to receive conducting pipes, not in all instances shown herein. An outlet opening 20 is provided in cover 16 for the discharge of chlorine from the dome 17. One or more openings 21 are also provided in cover 16 to which are connected inlet pipes 21' (Fig. 1), through which the brine is supplied to the anode chamber. The inflow of electrolyte into the cell is regulated, as usual, to maintain the electrolyte at a constant level, which is substantially at the tops of the cathodes 9. This regulation may be accomplished by any suitable means, such as the well-known float regulator, conventionally shown at $r$ in Fig. 1, and for use with such a regulator, a pipe 22 is provided, which leads from the lower part of the anode chamber 11 to the float chamber of the regulator. That portion of pipe 22 extending into the anode chamber may be made of hard rubber, or other suitable material, and this portion is sealed, where it passes through ring 15, by the concrete of which the latter is constructed and, where it passes through casing 5, by a stopper 23 of rubber or the like.

The annular anode chamber, suspended in casing 5, divides the latter, affording annular chambers 24 and 25, which are connected at their bases by the space 26 between the base of the anode chamber and the base of casing 5. Each of the chambers 24 and 25 is preferably sealed. The flanges 7 and 8, may be welded to column 6 and casing 5 respectively, and the joint between the flanges 7 and 14 and that between the flanges 8 and 13 may be suitably sealed. In addition, suitable closure coverings 27 and 28, which may be of pitch, putty, concrete or the like, may be applied on top of these flanges to fill the space between the peripheral wall of casing 5 and the adjacent wall of cover 16 and the corresponding space between the peripheral wall of column 6 and the adjacent wall of cover 16.

An opening 29 is provided in cover 28 for the discharge of hydrogen from the upper part of chamber 25, and an opening 30 is provided in the peripheral wall of casing 5 near its upper end to serve for the same purpose in connection with chamber 24. An outlet pipe 31 leads from the base of casing 5 to conduct away the caustic soda solution from chambers 24 and 25, and this pipe is provided with a trap 31', or other equivalent means, for forming a hydraulic seal. Pipes 32 and 33 lead to the upper parts of chambers 25 and 24, respectively, and are connected to a common pipe 32', which is adapted for connection to suction means conveniently indicated at $s$ in Fig. 3, whereby various degrees of reduction in the pressure existing in chambers 24 and 25 may be effected. By this provision it is possible to accelerate the flow of electrolyzed brine into the chambers 24 and 25 over the normal flow by percolation only. Furthermore, the suction applied in the manner described tends to keep the diaphragms from becoming clogged and prolongs their period of usefulness.

The two cathodes 9 are electrically connected together by any suitable means. For example, a lug 34 may be upturned from the marginal flange of each, and these two lugs are connected by a substantially U-shaped bus-bar 35 which straddles the cover 16 and the adjacent anodes 18 protruding therethrough.

In the operation of the invention, for the particular purpose disclosed, the sodium chloride solution or brine, which forms the electrolyte, is fed into the anode chamber 11 through the openings 21, being regulated, as described, so that the electrolyte is maintained at a constant level in chamber 11. Assuming that the series of anodes 18 are connected together and that the anodes and cathodes are connected to a suitable source of electricity, the current flows into the cell through the anodes, and thence through the electrolyte to the cathodes. The passage of current through the sodium chloride electrolyte results in its decomposition in the known manner, chlorine gas being emitted from the electrolyte and caustic soda being formed. The caustic solution percolates through the diaphragms 12 and passes into the chambers 24 and 25 from which it is continually drained by the pipe 31, and the hydraulic seal 31' prevents escape of gas. This caustic overflow consists of a weak solution of caustic soda admixed with sodium chloride brine. The hydrogen, formed at the cathodes flows into the chambers 24 and 25 and is conducted away through the openings 29 and 30.

Preferably, the suction device described is utilized and a partial vacuum established in the chambers 24 and 25. This results in an acceleration of the flow through the diaphragms and is generally useful in any cell for the reasons heretofore set forth. It is especially desirable in cells of the type disclosed, for, since the volume of the anode chamber is reduced to a minimum, it is important to get the nonelectrolyzed brine into the anode chamber as fast as it is electrolyzed therein in order to prevent impoverishment of the electrolyte and the consequent lowering of the efficiency of the cell by a decrease in the output without a corresponding decrease in the current consumed. The suction action on the diaphragms also tends to keep them from clogging and is valuable for this reason as well.

Obviously, although the cell has been disclosed in connection with its specific use in the electrolysis of sodium chloride brine, it may be employed for the electrolysis of various other suitable electrolytes.

The invention has been disclosed herein in an embodiment at present preferred, for illustrative purposes, but the scope of the invention is defined by the appended claims rather than by the foregoing description.

What I claim is:—

1. In an electrolytic cell, a casing, two endless cathodes therein arranged one within another, and forming an endless anode chamber, and anode-forming means within said chamber.

2. In an electrolytic cell, a casing, means therein affording a substantially annular anode chamber, said means including spaced cylindrical portions forming the cathodes of the cell and walls of said chamber, and at least one anode in the latter.

3. In an electrolytic cell, comprising a casing, two spaced cathodes therein affording between them an annular-shaped anode chamber, and an anode in said chamber.

4. In an electrolytic cell, comprising a casing, two spaced cathodes therein affording between them an annular-shaped anode chamber, and an anode in said chamber, having two opposite faces each of which substantially parallels the adjacent cathode surface.

5. In an electrolytic cell, a casing, two cylindrical cathodes suspended therein and arranged one with the other to form an annular anode chamber, and a series of anodes disposed in the anode chamber.

6. In an electrolytic cell, a casing, two endless cathodes therein arranged one within another and forming an endless anode chamber, diaphragms on the cathodes, a ring-like member between said cathodes serving to hold the diaphragms in position thereon, and anode-forming means within said chamber.

7. In an electrolytic cell, a casing, two endless cathodes therein arranged one within another and forming an endless anode chamber, a ring between the cathodes at their lower ends serving to seal the bottom of the anode chamber, a series of anodes in said chamber, and interengaging means provided on said ring and anodes to position the lower ends of the latter in the anode chamber and prevent their displacement therein.

8. In an electrolytic cell, two endless foraminous and diaphragm-carrying cathodes arranged one within another and forming between them an endless anode chamber, closure means for the top and bottom thereof, a closed and sealed casing encompassing the cathodes and affording space for the reception of solution flowing through said cathodes, and means provided for connecting said space to suction means, whereby partial vacuum may be established in said space to accelerate the flow through the cathodes.

9. In an electrolytic cell, two endless foraminous and diaphragm-carrying cathodes arranged one within another and forming between them an endless anode chamber, closure means for the top and bottom thereof, a closed and sealed casing encompassing the cathodes and affording space for the reception of solution flowing through said cathodes, a connection to the casing for the outflow of said solution including means for establishing an hydraulic seal, and means provided for connecting said space to suction means, whereby partial vacuum may be established in said space to accelerate the flow through the cathodes.

10. In an electrolytic cell, a casing, two endless diaphragm-carrying foraminous cathodes therein arranged one within another and affording between them an endless anode chamber, means for closing and sealing the bottom of said chamber, a sealed cover for the top of the latter affording a gas dome, an electrolyte inlet provided for the anode chamber, a gas outlet provided for said dome, a sealed closure for said casing, an outlet near the lower end of the latter for the solution escaping through the diaphragms, and means provided near the upper end of the casing for connection to suction means, whereby partial vacuum may be created in the casing outside the anode chamber to accelerate the flow through said diaphragms.

In testimony whereof I have affixed my signature.

SAMUEL M. GREEN.